(12) United States Patent
Jordan

(10) Patent No.: US 10,508,740 B2
(45) Date of Patent: Dec. 17, 2019

(54) ROTARY SEALING ARRANGEMENT

(71) Applicant: Trelleborg Sealing Solutions Germany GmbH, Stuttgart (DE)

(72) Inventor: Holger Jordan, Neuhausen auf den Fildern (DE)

(73) Assignee: Trelleborg Sealing Solutions Germany GmbH, Stuttgart (DE)

(*) Notice: Subject to any disclaimer, the term of this patent is extended or adjusted under 35 U.S.C. 154(b) by 0 days.

(21) Appl. No.: 15/352,615

(22) Filed: Nov. 16, 2016

(65) Prior Publication Data

US 2017/0097093 A1  Apr. 6, 2017

Related U.S. Application Data

(63) Continuation of application No. 13/574,251, filed as application No. PCT/EP2011/050769 on Jan. 20, 2011, now abandoned.

(30) Foreign Application Priority Data

Jan. 28, 2010  (DE) .......................... 10 2010 001 345

(51) Int. Cl.
| | |
|---|---|
| *F16J 15/16* | (2006.01) |
| *F16J 15/00* | (2006.01) |
| *F16J 15/3216* | (2016.01) |
| *F16J 15/3276* | (2016.01) |
| *F16J 15/34* | (2006.01) |

(52) U.S. Cl.
CPC .......... *F16J 15/164* (2013.01); *F16J 15/002* (2013.01); *F16J 15/3216* (2013.01); *F16J 15/3276* (2013.01); *F16J 15/3456* (2013.01)

(58) Field of Classification Search
CPC .... F16J 15/002; F16J 15/3216; F16J 15/3276; F16J 15/3456; F16J 15/441
USPC ....... 277/558, 353, 549, 551–552, 562, 572, 277/576, 577
See application file for complete search history.

(56) References Cited

U.S. PATENT DOCUMENTS

| | | | | | |
|---|---|---|---|---|---|
| 1,977,081 | A | * | 10/1934 | Olsen ..................... | F16C 33/74 277/424 |
| 2,509,151 | A | * | 5/1950 | Kasten ................. | F16J 15/3204 277/558 |
| 2,630,357 | A | * | 3/1953 | Smith .................. | F16J 15/3216 277/439 |
| 3,075,780 | A | * | 1/1963 | Mayer ................... | F16J 15/36 277/353 |
| 3,391,646 | A | * | 7/1968 | Schlosser ............. | F04B 53/121 417/439 |
| 3,493,235 | A | * | 2/1970 | Pautz .................... | B63H 5/10 277/433 |

(Continued)

FOREIGN PATENT DOCUMENTS

JP    01-146066    3/1988

*Primary Examiner* — Eugene G Byrd
(74) *Attorney, Agent, or Firm* — Paul Vincent

(57) ABSTRACT

A rotary seal arrangement has a rotatably mounted machine part and a machine part that forms a bearing for the rotatably mounted machine part. One of the machine parts forms a seal accommodating structure and the other one of the machine parts has a surface forming a sealing surface. At least one rotary seal is arranged in the seal accommodating structure. The rotary seal seals off a high-pressure area from a low-pressure area between the machine parts.

10 Claims, 9 Drawing Sheets

(56) References Cited

U.S. PATENT DOCUMENTS

| | | | | |
|---|---|---|---|---|
| 3,801,114 A * | 4/1974 | Bentley | F16J 15/3228 | 277/559 |
| 4,059,280 A * | 11/1977 | Eastwood | F16J 15/166 | 277/436 |
| 4,094,512 A * | 6/1978 | Back | F16J 15/008 | 277/320 |
| 4,434,833 A * | 3/1984 | Swanson | B60C 23/003 | 141/38 |
| 4,506,692 A * | 3/1985 | Schlegel | F16L 27/087 | 137/102 |
| 4,522,328 A * | 6/1985 | Holzer | F16J 15/3256 | 277/572 |
| 4,623,153 A * | 11/1986 | Nagasawa | F16J 15/322 | 277/551 |
| 4,637,295 A * | 1/1987 | Powers | F04B 15/02 | 277/562 |
| 4,861,044 A * | 8/1989 | Jay | B08B 9/08 | 277/353 |
| 5,066,027 A * | 11/1991 | Edlund | F16J 15/32 | 277/552 |
| 5,147,494 A * | 9/1992 | Torii | B60C 23/003 | 156/417 |
| 5,209,502 A * | 5/1993 | Savoia | F16J 15/3228 | 277/562 |
| 5,261,677 A * | 11/1993 | Gotoh | F16J 15/024 | 277/438 |
| 5,524,905 A * | 6/1996 | Thoman | F16J 15/166 | 277/572 |
| 5,957,460 A * | 9/1999 | Broadbent | B23K 15/04 | 219/121.14 |
| 6,688,603 B2 * | 2/2004 | vom Schemm | F16J 15/3216 | 277/549 |
| 6,830,641 B2 * | 12/2004 | Kosty | F16J 15/3228 | 156/221 |
| 6,913,264 B2 * | 7/2005 | Kurth | F16J 15/3264 | 277/353 |
| 7,055,828 B2 * | 6/2006 | Hatch | F16J 15/3228 | 277/351 |
| 7,201,380 B2 * | 4/2007 | Branchereau | F16J 15/164 | 277/549 |
| 7,770,896 B2 * | 8/2010 | Foti | F16J 15/3264 | 277/353 |
| 2003/0178790 A1 * | 9/2003 | Kapcoe | F16J 15/3228 | 277/627 |
| 2004/0007826 A1 * | 1/2004 | Lutaud | F16J 15/3228 | 277/549 |
| 2004/0124586 A1 * | 7/2004 | Branchereau | F16J 15/164 | 277/549 |
| 2004/0188950 A1 * | 9/2004 | Guillerme | F16J 15/3228 | 277/549 |
| 2004/0195780 A1 * | 10/2004 | Baehl | F16J 15/164 | 277/549 |
| 2005/0121858 A1 * | 6/2005 | Oricchio, Jr. | F16J 15/3212 | 277/549 |
| 2005/0134003 A1 * | 6/2005 | Bryde | F16J 15/3228 | 277/549 |
| 2005/0285350 A1 * | 12/2005 | Oricchio, Jr. | F16J 15/3228 | 277/549 |
| 2006/0091614 A1 * | 5/2006 | Oricchio, Jr. | F16J 15/3228 | 277/549 |
| 2006/0279046 A1 * | 12/2006 | Vogt | F16J 15/3228 | 277/549 |
| 2006/0290068 A1 * | 12/2006 | Berdichevsky | F16J 15/3228 | 277/549 |
| 2007/0138750 A1 * | 6/2007 | Warnecke | F16J 15/14 | 277/549 |
| 2008/0012238 A1 * | 1/2008 | Kapcoe | F16J 15/3252 | 277/572 |
| 2010/0230904 A1 * | 9/2010 | Peter | F16J 15/164 | 277/549 |

* cited by examiner

ROTARY SEALING ARRANGEMENT

This application is a continuation of application Ser. No. 13/574,251 filed Jul. 20, 2012 as the national stage of PCT/EP2011/050769 filed on Jan. 20, 2011 and claims Paris Convention priority from DE 10 2010 001 345.5 filed on Jan. 28, 2010, the entire disclosures of which are hereby incorporated by reference.

BACKGROUND OF THE INVENTION

The invention relates to a rotary seal arrangement, comprising a rotatably mounted machine part, a machine part that forms a bearing for the rotatably mounted machine part, wherein a first of the machine parts forms a seal-accommodating structure and the second of the machine parts has a surface forming a sealing surface, and at least one rotary seal arranged in the seal-accommodating structure. The rotary seal allows to seal off a high-pressure area from a low-pressure area between the machine parts.

Rotary seals of this kind are used, for example, to seal rotary feed-throughs. The high-pressure area is then constituted by a rotary feed-through area between the two machine parts. The rotary seal is also termed a rotary feed-through seal. The rotary feed-through permits fluids, that is, gases or liquids, a sealed transition between a stationary machine part and a rotating machine part. The first machine part having the seal-accommodating structure is usually constituted as the stationary machine part and the second machine part, as a shaft mounted rotatably within it. Such rotary feed-throughs are used, for example, in hydraulic applications or to input hot gas for heating a roller.

Known rotary feed-throughs seals are constituted, for example, as a sliding ring (mechanical seal) wherein the sliding ring usually has a sealing ring made of polytetrafluoroethylene (PTFE).

An example of such a rotary feed-through seal is described in DE 10 2007 062 470 A1. A rotary feed-through seal is designed such that as little fluid as possible, which is under positive pressure, enters the low-pressure area from the rotary feed-through area, that is, it is subject to low leakage. However, the lower the leakage, the greater the friction occurring between the sealing surface of the rotatably mounted machine part and the rotary feed-through seal. The wear of the rotary feed-through seal is correspondingly higher and a relatively large amount of driving energy is expended against that friction force. In particular, when shafts rotate at high speeds and with fluids under high pressure, the life of such known rotary feed-through seals is therefore short.

Moreover, entrained rotation of the rotary seal with the shaft must be avoided. This is frequently achieved by pressing the sealing ring into a holding element that is also ring-shaped and is made, for example, of steel. The holding element is mounted torsionally rigidly in the seal-accommodating structure. However, such a rotary feed-through seal is relatively complicated to manufacture. For torsionally rigid mounting, an anti-rotation element must be provided on the seal-accommodating structure and/or the holding element must be pressed into the seal-accommodating structure. Mounting in a simple slot, functioning as the seal-accommodating structure, is not possible because of the rigidity of the holding element.

The object of the invention is to provide a rotary seal arrangement that avoids the disadvantages of the prior art, wherein, in particular, simple mounting of the rotary seal between the machine parts is possible and entrained rotation of the sealing ring of the rotary seal is reliably avoided.

SUMMARY OF THE INVENTION

This task is solved by the elements of the independent claims. The dependent claims disclose preferred embodiments of the invention.

An inventive rotary seal arrangement has a rotatably mounted machine part and a machine part that forms a bearing for the rotatably mounted machine part, wherein a first of the machine parts constitutes a seal-accommodating structure and the second of the machine parts has a surface forming a sealing surface. At least one rotary seal disposed in the seal-accommodating structure is provided to seal a high-pressure area against a low-pressure area between the machine parts. The high-pressure area is at least temporarily under positive pressure relative to the pressure of the low-pressure area.

According to the invention, the rotary seal has an essentially rigid support element that is disposed essentially positionally stably with respect to the first machine part, a rubber-elastically deformable contact body in contact with the support element on the high-pressure area side, and a sealing ring that has a sealing edge and is in loose contact with the contact body.

The sealing ring has a wide side on both sides of the sealing edge and a seal seat edge area facing away from the sealing edge. The wide sides are interconnected via the seal seat edge area and the contact body is disposed at least partially between one of the wide sides of the sealing ring and the support element.

If the sealing surface is constituted as the lateral surface of a cylinder, that is, as the lateral surface of a rotating shaft, the contact body is disposed in the axial direction, that is, the direction of the axis of rotation, of the machine part mounted rotatably between the support element and the sealing ring.

If the sealing surface is constituted as a circle area or a circular ring area, that is, as an end face surface of a rotating shaft, the contact body is disposed in the radial direction, that is, perpendicular to the direction of the axis of rotation, of the machine part mounted rotatably between the support element and the sealing ring.

The contact body does not have to be disposed completely between the support element and the sealing ring. It can also extend beyond this area. "In loose contact" means that the sealing ring is not constituted integrally with the contact body. The sealing ring can be pressed against the contact body by the design of the rotary seal so that its relative position with respect to the contact body is fixed by friction forces occurring between the sealing ring and the contact body. The sealing ring does not have to be permanently in contact with the contact body. It can be in contact with the contact body only during a period in which a high pressure above a limit value determined by the design of the rotary seal is present in the high-pressure area, that is, it is pressed onto the contact body by the high pressure.

Due to the at least temporary pressing of the sealing ring against the rubber-elastic contact body, the relative position of the sealing ring with respect to the contact body is fixed by the friction forces occurring between the sealing ring and the contact body. The contact body is pressed evenly against the support element and/or can be constituted integrally with the support element. This reliably avoids entrained rotation of the sealing ring with the rotatably mounted machine part.

Simple mounting of the rotary seal is possible, in particular, if the support element is constituted integrally with the first machine part as part of the seal-accommodating structure. The seal-accommodating structure can be constituted as a ring-shaped slot. Because no additional rigid support element has to be provided, the sealing ring and, if not integrally constituted with the support element, the contact body can simply be inserted or clamped in the seal-accommodating structure as elastically deformable parts.

The inventive rotary seal arrangement is suitable, in particular, for rotary feed-throughs in which the second machine part is constituted as a radial shaft mounted in the first machine part, wherein the rotary seal is constituted in the shape of a ring and is disposed around the radial shaft. The rotary feed-through is therefore part of a pressure supply of a pressure accumulator whose pressure can be regulated and/or set as required.

If the contact body extends in the radial direction of the rotary seal between the sealing ring and the seal-accommodating structure, the sealing ring can be pretensioned in the radial direction toward the second machine part due to an elastic return force of the contact body. In this way, the force with which the sealing edge is pressed onto the sealing surface can be predetermined by the design of the rotary seal.

The contact body preferably has an area that is in contact with the sealing ring in the axial direction of the rotatably mounted machine part on the high-pressure area side. In this way, the edge of the sealing ring facing radially away from the sealing surface, that is, the seal seat edge area is disposed in a recess of the contact body. This edge then forms a type of pivot around which the sealing ring can tilt to a greater or lesser degree with alternating relative pressure differences between the high-pressure area and the low-pressure area so that the force with which the sealing edge is pressed onto the sealing surface can be dynamically adapted.

The inventive seal arrangement is especially preferably constituted as a rotary feed-through. In this case, the high-pressure area is constituted by a rotary feed-through area wherein, through the rotary feed-through area, a fluid that is under a positive pressure relative to the low-pressure area can be introduced from one of the machine parts through the sealing surface into the other of the machine parts. That is, the two machine parts together form a rotary feed-through and the rotary seal is disposed between the machine parts as a rotary feed-through seal. The rotary feed-through area forms the high-pressure area that is at least temporarily under positive pressure relative to the pressure of the low-pressure area.

The support element especially preferably extends, at least in a supporting area, obliquely with respect to the axial direction of the rotatably mounted machine part such that the sealing ring is pressed away from the sealing surface in the supporting area by the contact body. That is, the contact body is constituted such that the sealing ring with the sealing edge is pressed against internal elastic forces of the contact body toward the sealing edge when the contact body is pressed together from its sealing ring side by an applied positive pressure relative to the low-pressure area. This especially effectively reduces the frictional forces acting on the rotary feed-through seal between the sealing surface of the rotatably mounted machine part and the rotary feed-through seal.

In this way, it can be achieved that in a state without positive pressure, or a state with a pressure below a threshold value, in the rotary feed-through area, the sealing edge is essentially in contact with the sealing surface without a pressing force or is at a distance from the sealing surface. In a state with positive pressure, or a state with a pressure above the threshold value, in the rotary feed-through area, on the other hand, the sealing edge is in contact with the sealing surface in such a way as to provide a seal because the fluid under pressure then exerts a force component on the sealing ring acting against pressing away by the contact body. Therefore, an increased sealing effect is only achieved by the contacting sealing lip if a relatively high pressure is applied in the rotary feed-through area, that is, if the fluid in the rotary feed-through area is under a relatively high pressure. Because in very many applications of rotary feed-throughs, the fluid is only temporarily under high pressure, or an especially high pressure is only temporarily applied to it, low friction of the rotary seal with low leakage is achieved in this way. For example, if the fluid is a hot gas used to heat a roller, the sealing edge can then only be pressed forcefully onto the sealing surface if the hot gas is pressed into the roller with high pressure, for example, to heat the roller temporarily. Only in such a heating area is rotation of the roller significantly slowed by the sealing edge pressed against the sealing surface. If no hot gas is currently being pressed in, for example, because the operating temperature of the roller has been reached, the pressure of the fluid in the rotary feed-through area will drop and the sealing edge will, for example, be lifted from the sealing surface because the sealing ring is pressed away from the sealing surface by the contact body which is, in particular, elastically pretensioned and/or pressed away.

If the sealing ring has a cross-section that is angled concavely with respect to the rotary feed-through area, a force pressing the sealing edge onto the sealing surface against the internal elastic forces of the contact body can be generated especially well by the positive pressure prevailing at least temporarily in the sealing feed-through area of the fluid. The rotary feed-through area of the sealing ring and the sealing surface are delimited in such a way that there is an obtuse angle between the rotary feed-through area side surface of the sealing ring and the sealing surface.

The support element can be made of a rigid plastic or a metal, preferably of steel. The sealing ring can advantageously be made of PTFE, that is, polytetrafluoroethylene PUR (polyurethane). Low-wear, rubber-elastic materials such as FKM (fluorinated elastomer), or HNBR (rubber-elastic materials) can also be used as materials for the sealing ring. The contact body is preferably made of elastomer. It is important that it exhibits a rubber-elastic spring behavior.

If two rotary seals are preferably disposed mirror-symmetrically around the, or a, rotary feed-through area, the rotary feed-through area is reliably sealed off on both sides.

The invention is explained in more detail below based on examples with reference to the drawings. The drawings each show a cross-section oriented axially with respect to the rotatably mounted machine part, wherein only an upper half of the seal arrangement is shown in each case.

BRIEF DESCRIPTION OF THE DRAWING

FIG. 2 shows a further embodiment of an inventive rotary seal arrangement on a rotary feed-through.

DESCRIPTION OF THE PREFERRED EMBODIMENT

Figure 1A:
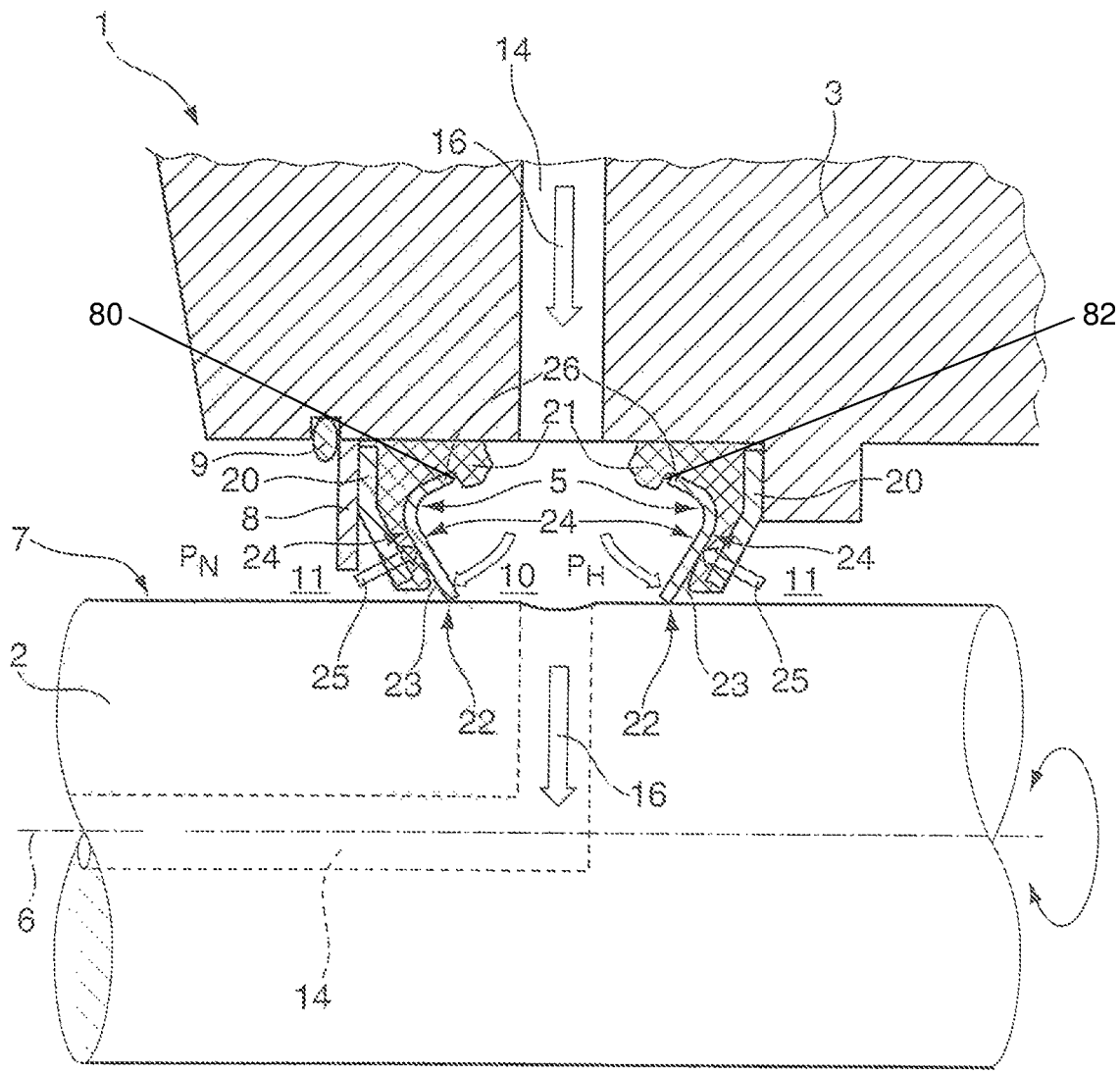
FIG. 1a shows a preferred embodiment of an inventive rotary seal arrangement for sealing off a sealing surface constituted as the lateral surface of a cylinder.

The representations in the drawings show the inventive object in a very schematic way and are not to scale. The individual parts of the inventive object are shown in such a way that their structure can be clearly illustrated.

Figure 1B:
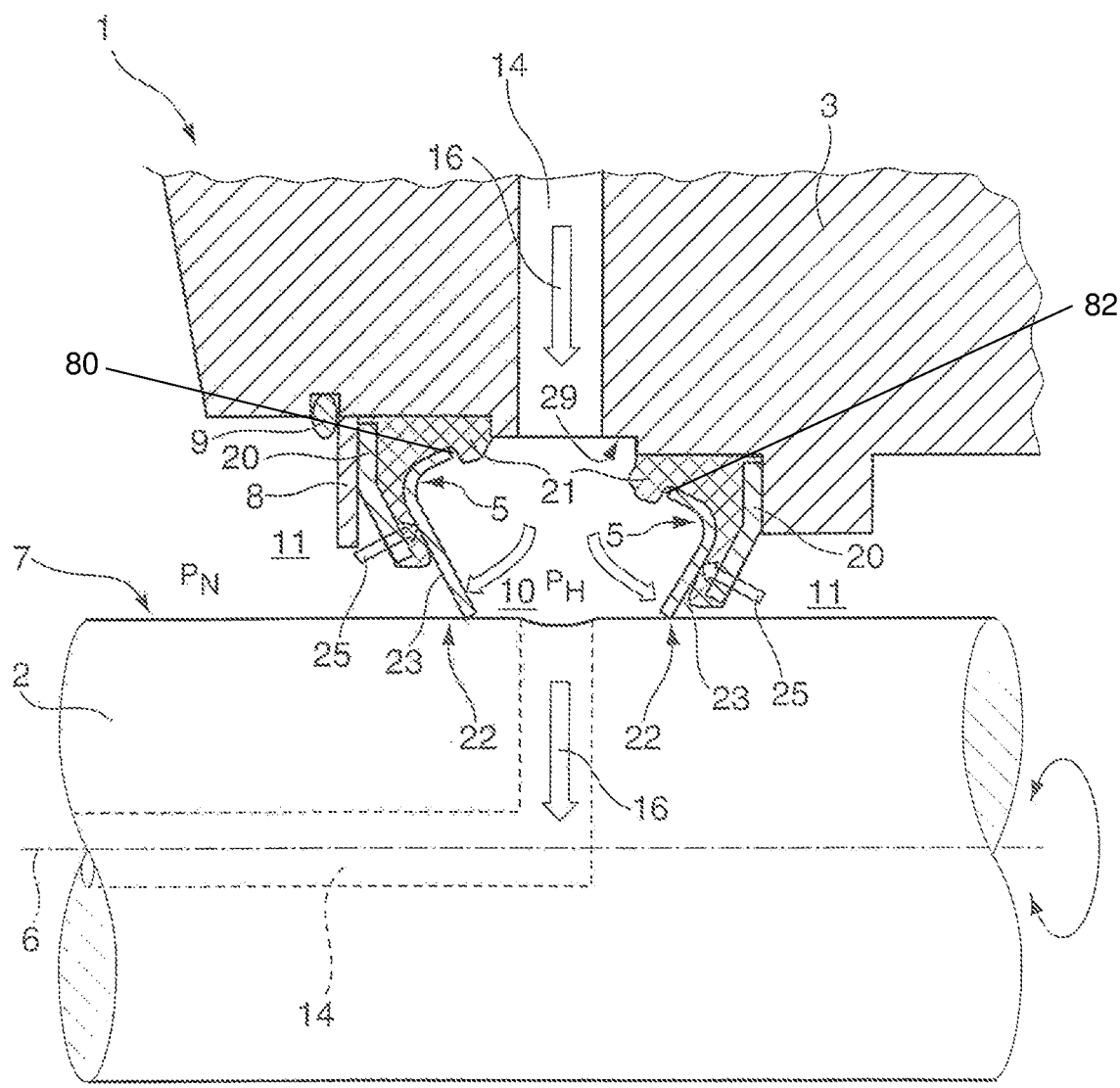
FIG. 1b shows a further preferred embodiment of an inventive rotary seal arrangement for sealing off a sealing surface constituted as the lateral surface of a cylinder.

FIGS. 1a and 1b show cross-sections of a preferred embodiment of an inventive rotary seal arrangement 1. Rotary seals 5 are mounted between a rotatably mounted machine part 2 (shaft) and a machine part 3 that forms a bearing for the rotatably mounted machine part 2. The rotary seals therefore have a ring shape that is symmetrical about the center of the ring. The rotatability of the shaft is symbolically shown in the figure by a curved double arrow. The second machine part 2 is constituted as a radial shaft mounted in the first machine part 3, wherein the rotary seals 5 are constituted in a ring shape and are disposed around the radial shaft. The axis of rotational symmetry 6 of the rotary seals 5 coincides with the axis of rotation of the radial shaft.

Alternatively, the machine part 3 can rotate around the machine part 2.

The rotary seals 5 are inserted in a seal-accommodating structure constituted by the first of the machine parts 3. The seal-accommodating structure does not have to be constituted by special shaping of the internal surface of the first, that is, the stationary machine part 3, as shown in the figure. The seal-accommodating structure may only be an area of surface that is not further specified, on which a rotary seal is positioned. The second of the machine parts 2, that is, the radial shaft in the case shown, has a surface forming a sealing surface 7 that is formed as the lateral surface of a cylinder. The seat of the rotary seals 5 is secured by a disk 8, which is in turn fixed by means of a spring washer 9 engaging in a slot.

By means of the rotary seals 5, a high-pressure area 10 constituted as a rotary feed-through area is sealed off from a low-pressure area 11 between the machine parts 2, 3. Through the rotary feed-through area 10, a fluid that is under positive pressure relative to the low-pressure area 11 with the low pressure PN can be introduced from the stationary machine part 3 through the sealing surface 7 into the rotatable machine part 3. The low pressure PN can, for example, be standard atmospheric pressure. For this purpose, a hole 14 is provided in the stationary machine part 3 that opens into the rotary feed-through area 10. The rotatable machine part 2 also has holes 14 that exit into the rotary feed-through area 10 and connect the rotary feed-through area 10 to one shaft end of the rotatable machine part 2 for leading through the fluid. The fluid can therefore be introduced through the holes 14 from the stationary machine part 3 into the rotatable machine part 2, which is symbolically shown by arrows 16 in the figure. The fluid can also flow against the direction of the arrows 16 if required.

Two rotary seals 5 are disposed mirror-symmetrically around the high-pressure area 10, or the rotary feed-through area. Each of the rotary seals 5 has an essentially rigid support element 20 that is disposed essentially positionally stably with respect to the first machine part 3, a rubber-elastically deformable contact body 21 in contact with the support element 20 on the rotary feed-through area side, and a sealing ring 23 that has a sealing edge 22 and a sealing ring 23 in loose contact with contact body 21.

Each of the sealing rings 23 has a wide side 24 on both sides of its sealing edge 22 and a seal seat edge area 26 facing away from the sealing edge. The wide sides 24 of each sealing ring 23 are interconnected via the corresponding seal seat edge area 26 and each contact body 21 is disposed between one of the wide sides 24 of each sealing ring 23 and the associated support element 20. The wide sides 24 form surface areas that constitute, at least on one of the sides of the sealing edge 22, a sufficient engagement surface for the fluid that is under pressure in the high-pressure area to press the sealing ring 23 onto the sealing surface 7 with the sealing edge 22 so as to provide a seal. The sealing ring 23 can, in particular, have the shape of a flat circular ring, preferably deformed concavely within itself, wherein the edge pointing radially inward constitutes the sealing edge 7.

The sealing rings 23 are therefore not permanently connected to the associated contact body 21 but are only in contact with it. There may also be interstices. The support element 20 is a component that is separate from the machine parts 2,3. The sealing edge 22 of the sealing rings 23 is disposed in each case on a load area of each sealing ring 23 protruding toward the sealing surface 7 beyond the support element 20 and the interposed contact body 21. In particular, this load area is variable in its position in the high-pressure area 10 when pressure is applied. When pressure is applied, the load area is therefore deformed in such a way that the sealing edge 22 is pressed onto the sealing surface 7.

The sealing rings 23 are each pressed away from the sealing surface 7 by the associated contact body 21. This is shown symbolically by arrows 25 in the figure. Pressing away is effected by the rubber-elastic properties of the contact body 21. The sealing rings 23 each have a cross-section that is angled concavely with respect to the rotary feed-through area 10. The rotary feed-through area 10 is delimited by the sealing rings 23 and the sealing surface 7 in such a way that there is an obtuse angle between the rotary feed-through area side surfaces of the sealing rings 23 and the sealing surface 7. The contact bodies 21 rest against each associated support element 20.

If a fluid under high pressure PH is introduced into the rotary feed-through area 10, as shown by the curved arrows in the figure, a force is exerted on the rotary feed-through area side surfaces of the sealing rings 23. This force presses the contact bodies 21 together against their internal rubber-elastic return forces which press the sealing ring 23 away from the sealing surface 7. This presses the sealing edges 22 onto the sealing surface 7 in such a way that the rotary feed-through area 10 is sealed essentially without leakage against the low-pressure area 11.

In the seal arrangement shown in FIG. 1a, the two rotary seals 5 have an identical radial diameter. Accordingly, the seal-accommodating structure, into which the rotary seals 5 are mounted, also have the same inside diameter on both sides of the hole 14 in the stationary machine part 3.

In FIG. 1b, the two rotary seals 5 each have a different radial diameter. Accordingly, the seal-accommodating structure into which the rotary seals 5 are mounted also have a different inside diameter on both sides of the hole 14 in the stationary machine part 3, forming a step 29 of the inside diameter.

Figure 2:
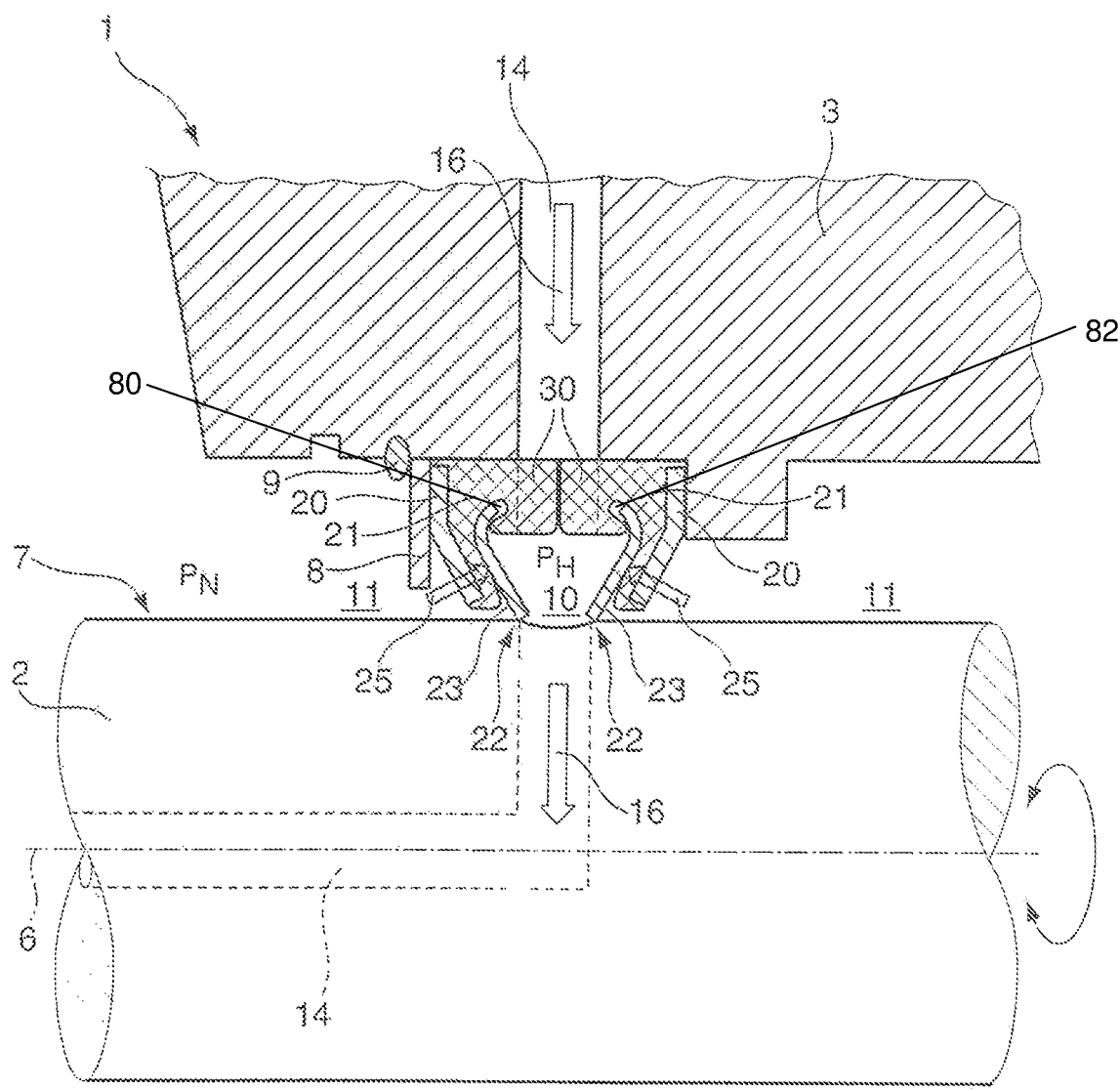

FIG. 2 shows a further embodiment of an inventive rotary seal arrangement on a rotary feed-through. The rotary seal arrangement is essentially the same as the embodiment shown in FIG. 1a, which is why the relevant features are referred to with the same reference symbols. Unlike the embodiment in FIG. 1a, the contact bodies 21 of the rotary seals 5 shown in FIG. 2 each have a bulge 30 in their area adjacent to the hole 14 in the stationary machine part 3. The bulges of the contact bodies 21 touch in such a way that they function as a non-return valve. If a fluid under high pressure is introduced through the hole 14 in the stationary machine part 3 in the direction of the arrow 16, the bulges are pressed apart so that the fluid is introduced into the high-pressure area 10. If the pressure of the fluid is reduced, the bulges 30 reclose the hole 14 in the stationary machine part 3 due to the elastic return forces of the rubber-elastic material of the contact bodies 21.

Figure 3:
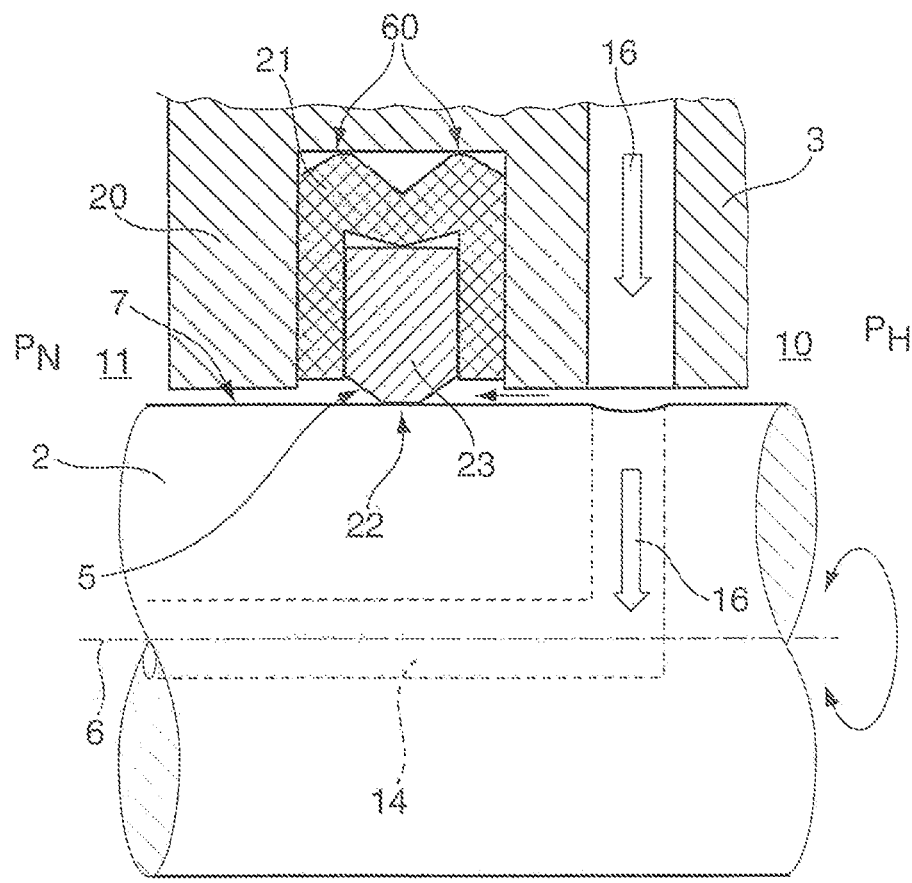
FIG. 3 shows a further embodiment of an inventive rotary seal arrangement.

FIG. 3 shows a further embodiment of an inventive rotary seal arrangement. As in FIG. 1, the rotary seal 5 of the rotary seal arrangement is disposed for sealing off a high-pressure area 10, constituted as a rotary feed-through area, from a low-pressure area 11 on a rotary feed-through between a second machine part 2, constituted as a rotatable shaft, and a first machine part 3, constituted as its bearing. In the figure, the rotary seal arrangement parts corresponding to FIG. 1 are referred to using the same reference symbols.

Unlike the embodiment in FIG. 1, the support element 20 is constituted integrally with the second machine part 2. The support element 20 is constituted by the low-pressure-side edge of a slot constituting the seal-accommodating structure into which the rubber-elastic contact body 21 and the sealing ring 23 are inserted.

The sealing ring 23 is clamped in the slot by the contact body 21. The contact body 21 has an area in contact with the sealing ring 23 on the high-pressure side in the axial direction of the rotatably mounted machine part 2. The edge of the sealing ring 23 facing radially away from the sealing surface is thus disposed in a recess of the contact body 21. At least when a sufficient positive pressure is applied in the high-pressure area 10, the sealing ring 23 is pressed firmly on the area of the contact body 21 disposed between the supporting 20 and the sealing ring 23 so that entrained rotation of the sealing ring 23 with the shaft is prevented.

The pressing of the sealing ring 23 onto the contact body is shown symbolically in the figure by an arrow in the area of the sealing surface.

The contact body 21 also extends in the radial direction of the rotary seal 5 between the sealing ring 23 and the seal-accommodating structure. The sealing ring 23 is pre-tensioned in the radial direction toward the second machine part 2 due to an elastic return force of the contact body 21. This causes the contact body 21, which is M-shaped in its basic shape, to be pressed with its upper two ends 60 that are pointed when uncompressed into the slot base of the slot. For that reason, the two ends 60 are shown rounded in the figure. The flexible mounting of the sealing ring 23 in the slot provided in this way is made yet more flexible by cavities between the slot base and the contact body 21 and/or between the contact body 21 and the sealing ring. Because the sealing ring 23 can easily tip over when pressure is applied, the sealing edge 22 can be flattened, or the sealing edge 22 forms two edges that seal alternatively against the sealing surface 7, depending on the pressure applied.

Figure 4:
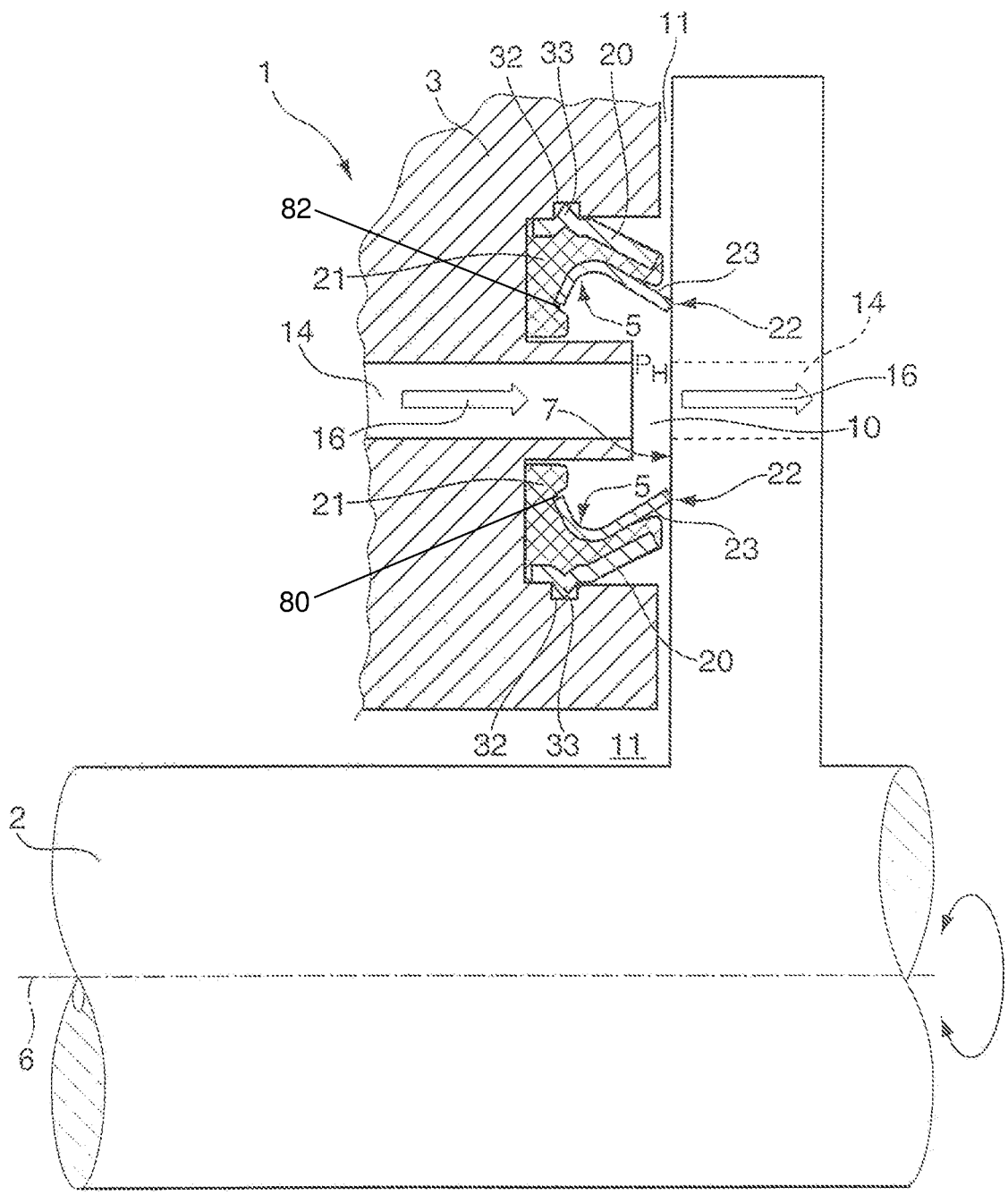
FIG. 4 shows an embodiment of an inventive rotary seal arrangement for sealing off a rotary feed-through in an end face of a rotatably mounted machine part.

FIG. 4 shows an embodiment of an inventive rotary seal arrangement with two rotary seals 5 for sealing off a rotary feed-through in an end face of a rotatably mounted machine part 2. End face refers to a side of the rotatable machine part 2 to the surface of which the axis of rotation of the rotatable machine part 2, i.e. its axial direction, is perpendicular. Characteristics that are the same as the rotary seal arrangement of FIG. 1a are referred to by the same reference symbols. The end face of the rotating machine part 2 forms the sealing surface 7 and is constituted as a circular ring area. The contact bodies 21 are disposed in the radial direction of the rotatably mounted machine part 2 between the corresponding support element 20 and each sealing ring 23. The stationary machine part 3 has, on both sides of a hole 14 for a fluid supply, a ring-shaped slot as a seal-accommodating structure into which the rotary seals 5 are inserted. On each of the slot edges of the slots facing away from the hole, a notch 32 is provided into which, in each case, a projection 33 provided on the support elements 20 engages, whereby the rotary seals 5 are fixed in their position axially with respect to the rotary machine part 2.

FIGS. 1a, 1b, 2 and 4 illustrate embodiments in which the end of the sealing ring 23 that is radially separated from the rotatably mounted machine part 2 is spaced apart from an adjacent region of the contact body 21 by a gap 80, 82. The gap 80, 82 permits radial displacement of the sealing ring 23 relative to the contact body 21 and away from the rotatably mounted machine part 2 as long as the pressure PH present in the high-pressure area 10 does not exceed the threshold pressure.

FIGS. 5a to 5e show axial cross-sections of different embodiments of rotary seals of an inventive rotary seal arrangement. The embodiments are essentially the same as the rotary seal according to FIG. 1. For this reason, only special details will be described here. In the figures, the rotary seal arrangement parts corresponding to those in FIG. 1 are referred to by the same reference symbols. The contact bodies 21 of the rotary seals shown each have a foot-like widened section on the seal-accommodating structure side. The contact body extends in the radial direction of the rotary seal 5 between the sealing ring 23 and the seal-accommodating structure, and the contact body 21 has an area in contact with the sealing ring 23 in the axial direction of the rotatably mounted machine part 2 on the high-pressure area side. The latter area extends different distances toward the sealing edge. The edge of the sealing ring 23 facing radially away from the sealing surface is thus disposed in a recess of the contact body 21.

Figure 5A:
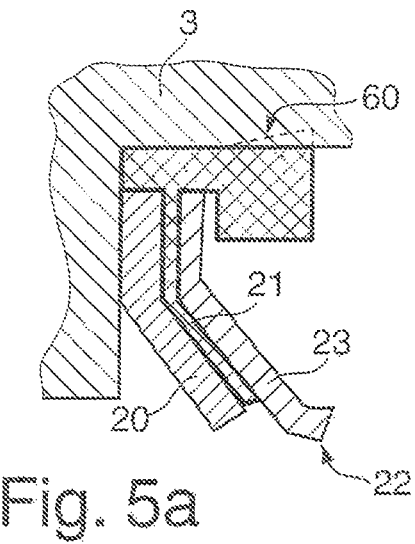
FIG. 5a shows an embodiment of an inventive rotary seal arrangement.
Figure 5B:
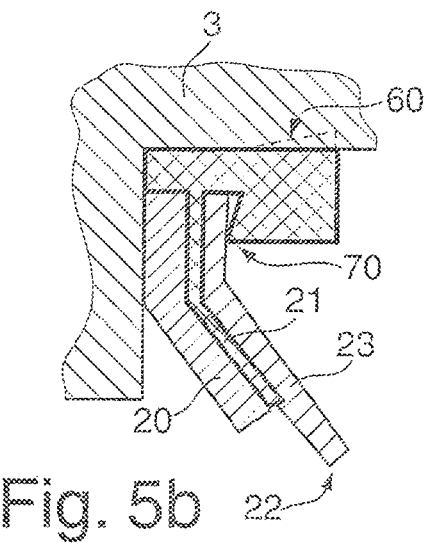
FIG. 5b shows a further embodiment of an inventive rotary seal arrangement.
Figure 5C:
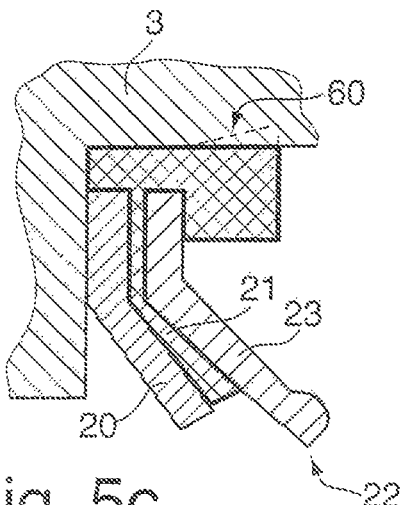
FIG. 5c shows an additional embodiment of an inventive rotary seal arrangement.
Figure 5D:
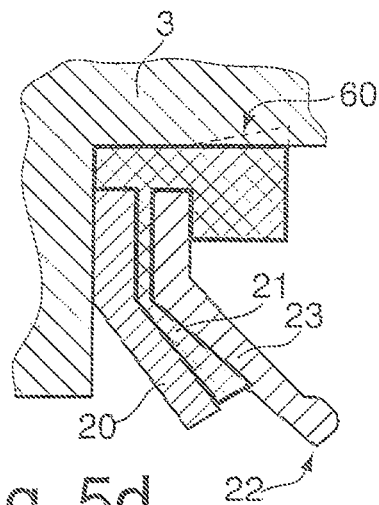
FIG. 5d shows another embodiment of an inventive rotary seal arrangement.
Figure 5E:
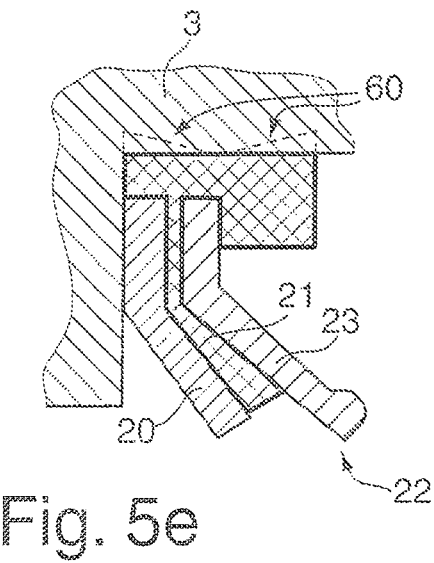
FIG. 5e shows an example of an inventive rotary seal arrangement.

The contact bodies 21 each have at least one end 60 coming to a point on the sealing accommodating side. These ends 60 are pressed onto the seal-accommodating structure in such a way that the contact body 21 is elastically deformed, providing pretensioning of the sealing ring 23. This is symbolized by the dashed-line representation of the ends 60. In this way, the edge of the sealing ring 23 facing radially away from the sealing surface is also elastically clamped in the recess in the contact body 21 in each case. In FIG. 5b, this is effected by an edge 70 bridging a space. The rotary seals differ further in the shaping of the support elements 20, the sealing rings 23, and the areas of the contact bodies 21 between them.

Figure 5F:
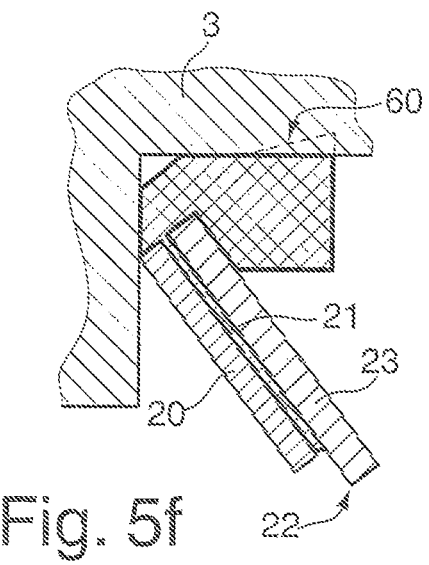
FIG. 5f shows a further example of an inventive rotary seal arrangement.

In FIGS. 5a to 5e, the support elements 20, the sealing rings 23 and the areas of the contact bodies 21 between them each have a cross-section that is angled concavely with respect to the high-pressure area. In this case, in the embodiments of FIGS. 5c to 5e, the area of the contact body 21 disposed between the support element 20 and the sealing ring 23 becomes conically wider toward the sealing edge. In FIG. 5f, on the other hand, the cross-section of the support element 20, of the sealing ring 23, and of the area of the contact body 21 between them are not angled.

All the embodiments shown have the common feature that, in each case, the sealing ring 23 is pretensioned in the radial direction toward the second machine part 2, which is not shown, due to an elastic return force of the contact body 21. Because the support element 20 extends obliquely with respect to the axial direction of the rotatably mounted machine part (not shown) at least in a respective supporting area, the contact body 21 is pressed together in this area between the support element 20 and the sealing ring due to this pretensioning. This in turn presses the sealing ring 23 in the supporting area away from the sealing surface due to the contact body 21. The contact body 21 is disposed in each respective supporting area radially between each support element 20 and the associated sealing ring 23.

Figure 6:
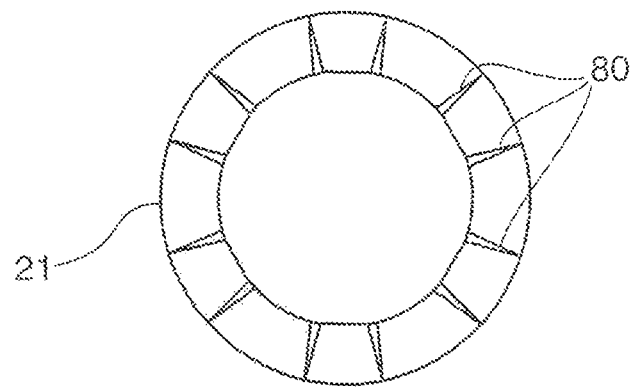
FIG. 6 shows an embodiment of a contact body of an inventive rotary seal arrangement.

FIG. 6 shows an embodiment of the contact body 21 of an inventive rotary seal arrangement in an axially oriented plan view. It therefore shows the surface of the contact body 21 on the sealing ring side. The contact body can also have flat surfaces on the sealing ring side; in this embodiment, however, the surface has projections 80 toward the sealing ring so that a distance between the contact body 21 and the sealing ring is retained when the contact body 21 is compressed.

Figure 7:
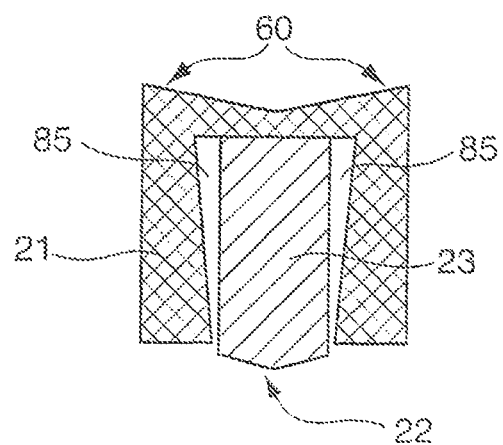
FIG. 7 shows a further embodiment of an inventive rotary seal, similar to the rotary seal in FIG. 3.

FIG. 7 shows an axial cross-section of a further embodiment of an inventive rotary seal similar to the rotary seal in FIG. 3. The two pointed ends 60 of the contact body 21 provided for compression and a distance 85 on both sides between the contact body 21 and the sealing ring 23 can be seen. The distances 85 can be filled after insertion of the contact body 21 and of the sealing ring into a slot of a seal-accommodating structure due to axial compression of the contact body 21, whereby the sealing ring 23 of the contact body 21 can be securely clamped.

Figure 8A:
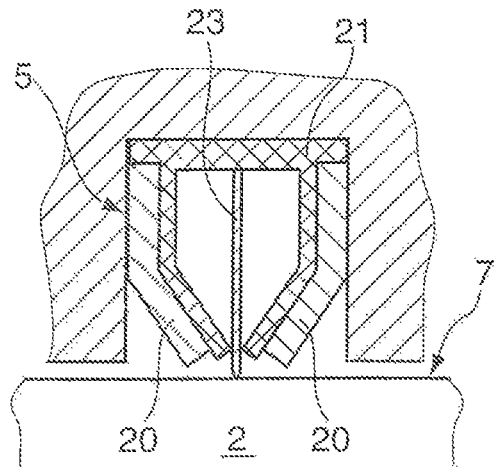
FIG. 8a shows an embodiment of an inventive rotary seal arrangement.
Figure 8B:
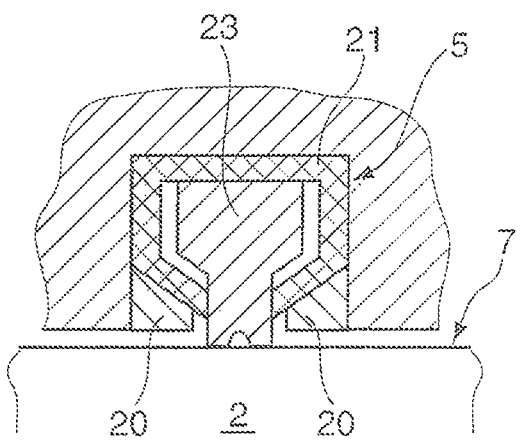
FIG. 8b shows a further embodiment of an inventive rotary seal arrangement.
Figure 8C:
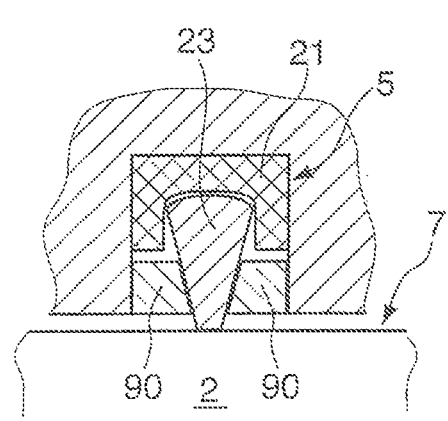
FIG. 8c shows an additional embodiment of an inventive rotary seal arrangement.
Figure 8D:
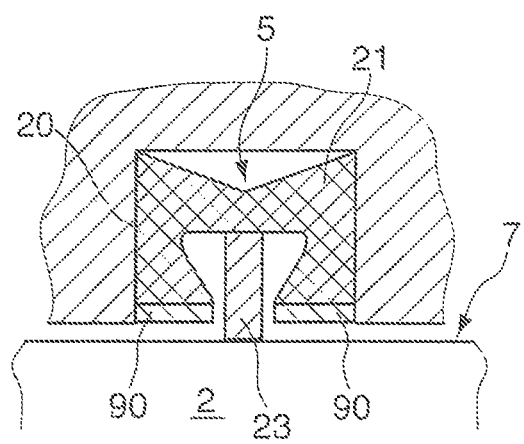
FIG. 8d shows another embodiment of an inventive rotary seal arrangement.
Figure 8E:
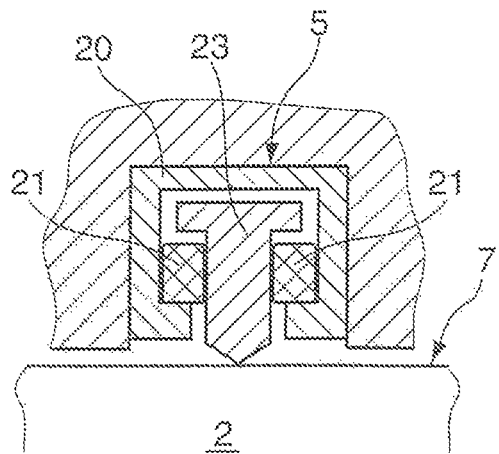
FIG. 8e shows an example of an inventive rotary seal arrangement.
Figure 8F:
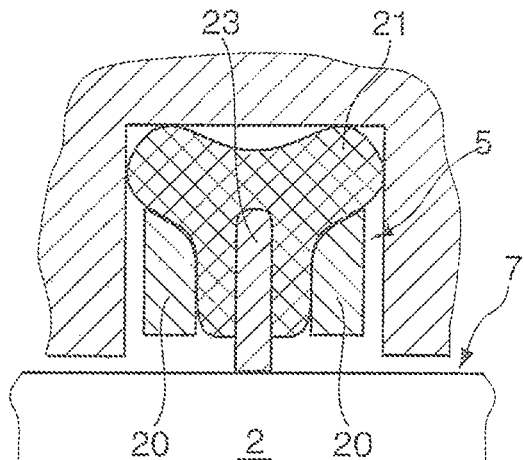
FIG. 8f shows a further example of an inventive rotary seal arrangement.
Figure 8G:
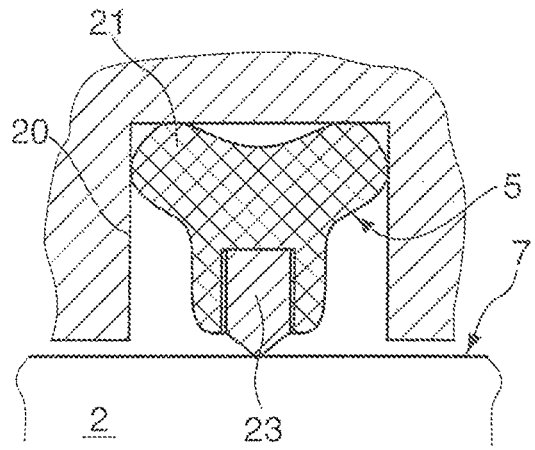
FIG. 8g shows an additional example of an inventive rotary seal arrangement.
Figure 8H:
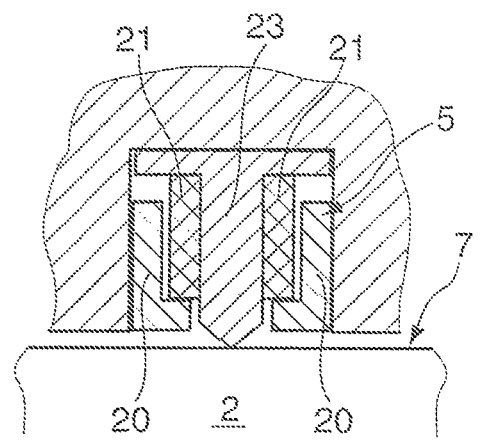
FIG. 8h shows another example of an inventive rotary seal arrangement.

FIGS. 8a to 8h show axial cross-sections of various embodiments of rotary seals 5 of an inventive rotary seal arrangement. The rotary seals 5 of each rotary seal arrangement are each disposed in a seal accommodation structure constituted as a slot, of a stationary machine part 3 and each seal a respective sealing surface of a rotating machine part 2 constituted as the lateral surface of a cylinder. In each case, a support element 20, a rubber-elastic contact body 21, and a sealing ring 23 are provided. In each case, the contact body 21 is at least partially disposed in the axial direction of the rotatably mounted machine part 2 between the support element 20 and the sealing ring 23. The contact bodies 21 are each disposed symmetrically around the sealing ring 23. In FIGS. 8e and 8h, two mutually separated contact bodies 21 are provided. In FIG. 8e, the support element 20 is constituted as a component facing away from the sealing edge and gripping round the sealing ring 23 and the contact body 21, e.g. made of sheet metal. In FIGS. 8d and 8g, the support element 20 is constituted by the slot edges of the seal-accommodating structure. For this purpose, no additional separate support element is provided. In FIGS. 8c and 8d, a position fixing element 90 disposed on both sides of the sealing ring is provided in each case. Each of these position fixing elements 90 prevents the contact body 21 and/or the sealing ring 23 from being pressed too strongly onto the sealing surface 7.

A rotary seal arrangement is proposed with
- a rotatably mounted machine part 2 and a machine part 3 that forms a bearing for the rotatably mounted machine part 2, wherein a first of the machine parts 3 constitutes a seal-accommodating structure and the second of the machine parts 2 has a surface forming a sealing surface 7.
- at least one rotary seal 5 disposed in the seal-accommodating structure to seal a high-pressure area 10 against a low-pressure area 11 between the machine parts 2,3.

The rotary seal 5 has an essentially rigid support element 20 that is disposed essentially positionally stably with respect to the first machine part 3, a rubber-elastically deformable contact body 21 in contact with the support element 20 on the high-pressure area side, and a sealing ring 23 that has sealing edge 22 and sealing ring 23 that is preferably loosely in contact with the contact body 21.

The sealing ring 23 has a wide side 24 on each side of the sealing edge 22 and has a seal seat edge area 26 facing away from the sealing edge and the wide sides 24 are interconnected via the seal seat edge area 26. The contact body 21 is at least partially disposed between at least one of the wide sides 24 of the sealing ring 23 and the support element 20.

The invention is not limited to the embodiments stated above. Rather, a number of variants are conceivable which make use of the characteristics of the invention although fundamentally differently constituted.

I claim:

1. A rotary feed-through, the rotary feed-through having a rotatably mounted machine part and a machine part that forms a bearing for the rotatably mounted machine part, the rotary feed-through comprising:
   a first machine part forming a seal-accommodating structure;
   a second machine part having a surface forming a sealing surface; and
   at least one rotary seal arranged in said seal-accommodating structure for sealing off a high-pressure, rotary feed-through area from a low-pressure area between said first and second machine parts, wherein a fluid that is under positive pressure relative to the low-pressure area is introduced through said sealing surface and through the rotary feed-through area, from one of said first and second machine parts into an other one of said first and second machine parts, the rotary seal comprising:
   a support element, said support element being essentially rigid and positionally stable with respect to said first machine part; a rubber-elastically deformable contact body in contact with said support element on the high-pressure area side; and a sealing ring made from PTFE and having a sealing edge, said sealing ring having a wide side on each side of said sealing edge and a seal seat edge area facing away from said sealing edge, said wide sides being interconnected via said seal seat edge area, wherein said contact body is at least partially disposed between at least one of said wide sides of said sealing ring and said support element, said support element extending, at least in a supporting area, obliquely with respect to an axial direction of the rotatably mounted machine part, said contact body and said sealing ring having a mutual contact area extending along at least one wide side of said sealing ring from said seal seat edge area towards said sealing edge and terminating proximate said sealing edge, wherein said contact body does not contact said sealing surface of said second machine part, and said contact body extends in a radial direction below said seal seat edge area of said sealing ring, said first machine part, said second machine part, said support element, said contact body and said sealing ring all being disposed, structured and dimensioned such that, in the supporting area, said sealing ring is pressed away from said sealing surface by said contact body and, when exposed to a fluid pressure lying below a threshold pressure, said sealing edge seats on said sealing surface in the rotary feed-through area without exerting a pressing load or such that said sealing edge is separated from said sealing surface and, in the event of the fluid pressure exceeding the threshold pressure, said sealing ring and said sealing edge are directly pressed by the fluid, in opposition to internal elastic forces of said contact body, towards said sealing surface and against said contact body throughout said mutual contact area to seat in a sealing manner on said sealing surface, said sealing ring thereby being in loose contact with said contact body and not permanently connected thereto, wherein, in consequence of said loose contact, a relative position of said sealing ring with respect to said contact body is first fixed by frictional forces between said sealing ring and said contact body throughout said mutual contact area, which are generated by the fluid pressure when that fluid pressure exceeds the threshold pressure, said first machine part, said second machine part and said rotary seal thereby being disposed, structured and dimensioned to permit radial displacement of said sealing ring relative to said contact body and away from said rotatably mounted machine part as long as the fluid pressure does not exceed the threshold pressure.

2. The rotary feed-through of claim 1, wherein said sealing surface is constituted as a lateral surface of a cylinder and said contact body is at least partially disposed, in an axial direction of the rotatably mounted machine part, between said support element and said sealing ring, wherein said radial displacement of said sealing ring moves said sealing ring into a gap located between a distal end of said sealing ring facing away from said rotatably mounted machine part and a portion of said contact body proximate to but separated from said distal end.

3. The rotary feed-through of claim 1, wherein said sealing surface is disposed on an end face of the rotatably mounted machine part extending perpendicular to an axis of rotation of that rotatably mounted machine part, wherein said contact body is at least partially disposed, in a radial direction of the rotatably mounted machine part, between said support element and said sealing ring.

4. The seal of claim 1, wherein said second machine part is constituted as a radial shaft mounted in said first machine part and said rotary seal is ring-shaped and disposed about said radial shaft.

5. The rotary feed-through of claim 1, wherein said support element is constituted integrally with said first machine part as part of said seal-accommodating structure.

6. The rotary feed-through of claim 1, wherein said contact body extends, in a radial direction of said rotary seal, between said sealing ring and said seal-accommodating structure, said sealing ring being pretensioned in the radial direction toward said second machine part by an elastic restoring force of said contact body.

7. The rotary feed-through of claim 1, wherein said contact body has an area in contact with said sealing ring in an axial direction of the rotatably mounted machine part, on the high-pressure area side, wherein said edge of said sealing ring facing radially away from said sealing surface is disposed in a recess of said contact body.

8. The rotary feed-through of claim 1, wherein said sealing ring has a cross-section that is angled concavely with respect to the rotary feed-through area.

9. The rotary feed-through of claim 1, wherein said support element is made of steel and/or said contact body is made from an elastomer.

10. The rotary feed-through of claim 1, wherein two rotary seals are preferably disposed mirror-symmetrically about the high-pressure area.

* * * * *